UNITED STATES PATENT OFFICE.

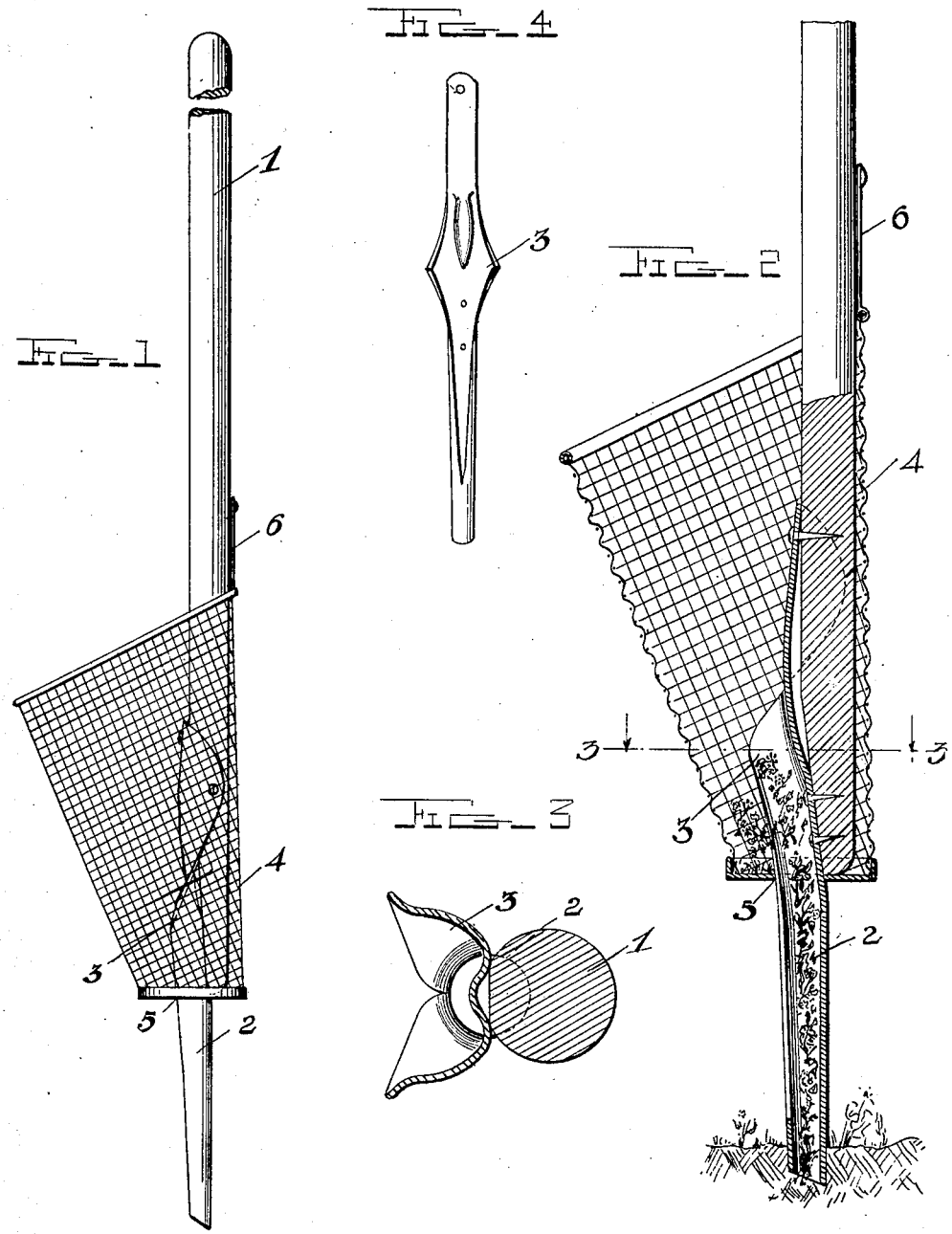

JOHN R. BAYLIS, OF LOCKPORT, NEW YORK.

DIGGING IMPLEMENT.

No. 913,350.      Specification of Letters Patent.      Patented Feb. 23, 1909.

Application filed October 12, 1908. Serial No. 457,312.

*To all whom it may concern:*

Be it known that I, JOHN R. BAYLIS, a citizen of the United States, residing at Lockport, in the county of Niagara and State of New York, have invented certain new and useful Improvements in Digging Implements; and I do declare the following to be a full, clear, and exact description of the invention, such as will enable others skilled in the art to which it appertains, to make and use the same.

This invention relates to an improvement in digging implements and comprises the combination of a pressure operated tubular digger and a receptacle arranged to receive material from the digger.

One of the objects of the invention is to produce a simple digging implement for removing weeds from the earth capable of being operated solely by pressure.

Another object of the invention is the production of a digging implement capable of being used for digging post holes, removing weeds or make excavations for other purposes and provided with a tubular digging tool arranged to deliver earth and other matter excavated into a receiving basket or receptacle.

With the foregoing and other objects in view, the invention consists of certain novel features of construction, combination and arrangement of parts, as will be more fully described and particularly pointed out in the appended claims.

In the accompanying drawings, Figure 1 is a side elevation of my improved digging implement; Fig. 2 is a longitudinal section thereof; Fig. 3 is a horizontal section on line 3—3 of Fig. 2 and Fig. 4 is a perspective view of a tubular digging tool.

In the accompanying drawings, the numeral 1 designates a handle which is provided at its lower end with a digging tool 2. The lower end of the digging tool is formed tubular and preferably provided with a cutting edge and tapers upwardly toward the upper end to form a funnel shaped head 3, which head is secured in any suitable manner to the lower end of the handle 1. A basket or receptacle 4 formed with a bottom opening 5 is slidably supported on the digging tool 2 which tool is arranged to extend around the opening 5, and said basket or receptacle is secured to or suspended from the handle 1 by means of a wire 6 or equivalent fastening means.

The digging tool 2 may be formed integral with the handle 1 or formed on the basket or receptacle 4 in which case the handle 1 will be connected to said basket by a suitable supporting frame and said digging tool may be arranged to be removably secured on the handle 1. When it is desired to remove weeds from the lawn, garden or other place, the tool 2 is placed in a vertical position over the weed to be removed and pressure is applied upon the handle 1 thereby forcing said tool into the earth and around the weed to be removed. When the tool 2 is withdrawn from the earth, the weed will be held by the digging tool and by exerting the digging tool successively in the earth in a similar manner, said weed will be forced into the receptacle or basket 4 by the succeeding quantity of earth or by the weeds or other matter removed. The basket 4 is preferably formed with an open upper end so that its contents may be removed without any difficulty when it is desired to do so.

The basket 4 may be formed of wire mesh or any other material and the digging tool 2 is preferably provided with an inclined end. By enlarging the size of the digging tool 2 and the basket or receptacle 4, the implement may be used for digging post holes, or for making excavations for other purposes.

My improved digging implement may be used to mend broken places or bare spots in the sod surrounding the weed removed by the implement by using a tool of a larger size than was used to remove the weed and forming a larger hole in the ground and putting earth plugs cut from fresh sod, formed with the tool, in the ground.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

I claim as my invention:—

1. A digging implement comprising a tubular digging tool, a receptacle arranged to receive material from the tool, and means for connecting the tool to the receptacle and supporting the same.

2. A digging implement comprising a handle, a tool secured to the lower end of the handle and adapted to convey material therethrough, and a receptacle supported on the handle and arranged to receive material from the digging tool.

3. A digging implement comprising a handle provided with a tubular digging tool and a receptacle supported on the handle and arranged to receive material from the digging tool.

4. A digging implement comprising a handle provided with a digging tool formed tubular and with a funnel-shaped head and a receptacle supported on the handle and arranged to receive material from the digging tool.

5. A digging implement comprising a handle provided with a tubular cutting tool having a funnel-shaped head, and a basket formed with an opening through which said tool is arranged to extend and mounted on the handle and arranged to receive material from the digging tool.

6. A digging implement comprising a handle, a receptacle formed with an opening and a tool extending through the opening and arranged to deliver material into the receptacle.

7. A digging implement comprising a handle provided with a tubular digging tool, and means for receiving and holding the material excavated by the digging tool.

8. A digging implement comprising supporting means, receiving means arranged on the supporting means, and a digging tool formed to allow for the passage of material therethrough secured on the supporting means and arranged to deliver material through the bottom of the receiving means.

9. A digging implement comprising a handle provided with a tubular digging tool and a receptacle arranged to receive material from the digging tool slidably supported on the handle.

10. A digging implement comprising a handle provided with a digging tool formed with a funnel-shaped head and a receptacle formed with an opening through which said tool is arranged to extend and slidably supported on the handle.

11. A digging implement comprising a handle, a basket slidably and removably secured to the handle, and a digging tool projecting through the basket and secured to the handle for excavating material and depositing the same into the basket.

12. A digging implement comprising a handle, a basket removably and slidably secured around the lower end of the handle having an opening formed in its bottom portion, and a digging tool having a passage therethrough secured to the lower end of the handle and adapted to deliver material through the opening of the basket into the same.

In testimony whereof I have hereunto set my hand in presence of two subscribing witnesses.

JOHN R. BAYLIS.

Witnesses:
  EDWARD G. PARKER,
  MABEL L. LERCH.